United States Patent Office 3,579,549
Patented May 18, 1971

3,579,549
ACYL DERIVATIVES OF THE CONDENSATION POLYMERS OF ALPHA-HYDROXY-PROPIONIC ACID WITH BETA-HYDROXYBUTYRIC ACID AND/OR BETA-HYDROXYPROPIONIC ACID
Hans H. Stockmann, Plainfield, Dilip K. Ray-Chaudhuri, Somerset, and Richard M. Boettger, Morristown, N.J., assignors to National Starch and Chemical Corporation, New York, N.Y.
No Drawing. Filed Sept. 29, 1967, Ser. No. 671,566
Int. Cl. A21d 2/16; C11c 3/04
U.S. Cl. 260—410.9R                 14 Claims

ABSTRACT OF THE DISCLOSURE

Acyl derivatives of the condensation polymers of alpha-hydroxypropionic acid with beta-hydroxybutyric acid and/or beta-hydroxypropionic acid, as well as the alkali metal, alkaline-earth metal and ammonium salts thereof; the latter derivatives serving as food emulsifiers and as shortening aids. A process for preparing baked goods as well as the baked goods resulting therefrom, said process comprising the incorporation of the above specified derivatives into the raw dough mix prior to the baking thereof. The resulting baked goods are characterized by their prolonged retention of freshness, fine texture, good color and substantial volume.

BACKGROUND OF THE INVENTION

It is usually necessary for commercial baked goods, in general, and for bread, in particular, to exhibit certain desirable characteristics including, for example, prolonged freshness, fine texture, true color and a substantial volume. Emulsifier systems and additives such as acyl lactic acid derivatives, have, in the past, been incorporated into baked goods in order to provide anti-staling properties as well as to improve volume and taste. In many instances, the cost of preparing such additives has been high while the beneficial effects upon the resulting baked goods have, unfortunately, been minimal.

SUMMARY OF THE INVENTION

It is the prime object of this invention to prepare novel acyl derivatives of the condensation polymers of alpha-hydroxypropionic acid with beta-hydroxybutyric acid and/or beta-hydroxypropionic acid as well as the alkali metal, alkaline-earth metal and ammonium salts thereof.

It is a further object to prepare baked goods by means of a novel process whereby the specified acyl derivatives are incorporated, as shortening aids, into the raw dough mixes utilized for their preparation prior to the baking of the latter mixes.

Additionally, it is an object to prepare baked goods exhibiting improved properties of prolonged freshness, fine texture, good color and substantial volume.

Various other objects and advantages of our invention will be apparent from the following description thereof.

The novel acyl derivatives of this invention thus correspond to the formula

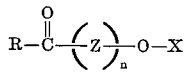

wherein

Z represents the repetitive polymeric chain structure, or mer, corresponding to the formula

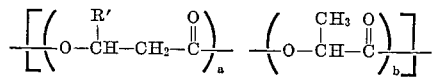

wherein R′ is selected from the group consisting of hydrogen atoms and methyl radicals; the latter mer representing the random spatial arrangement of its component moieties which are derived from monomeric alpha-hydroxypropionic acid, i.e.

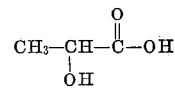

and at least one monomeric beta-hydroxyalkanoic acid selected from the group consisting of monomeric beta-hydroxybutyric acid, i.e.

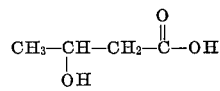

and monomeric beta-hydroxypropionic acid, i.e.

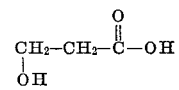

the actual number of moieties, within the mer, which is derived from each of the latter monomers being dependent upon the mole ratio of the respective monomers at the initiation of the condensation polymerization reaction; said mole ratio being within the limits of the ratio $a:b$ which may range from about 1:4 to 4:1;
$n$ ranges from 0.1 to 12 inclusive;
R is a radical selected from the group consisting of aliphatic radicals containing from 3 to 21 carbon atoms, cycloaliphatic, aromatic, and ar-aliphatic radicals; and,
X is selected from the group consisting of hydrogen atoms, alkali metal cations, alkaline-earth cations and ammonium radicals.

As noted above, the spatial configuration of the beta-hydroxy alkanoic acid(s) and alpha-hydroxypropionic acid moieties in the mer is a purely random arrangement and is limited only by the respective concentrations of the monomeric components in the initial reaction mixture. This random configuration may, therefore, consist of any conceivable variety of linear arrangements wherein, within the above described limitations, any number of moieties of each of the available monomeric species may align themselves with any number of moieties derived from the identical monomeric species or with any number of moieties derived from the other monomeric species which are present in the system. Thus, for example, if a 1:1 mole ratio of beta-hydroxybutyric acid and alpha-hydroxypropionic acid is utilized in the polymerization reaction, Z, in the above formula, would correspond to one of the following structures:

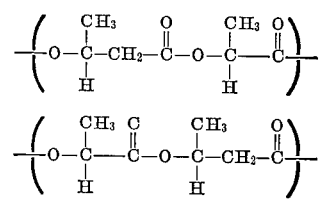

DESCRIPTION OF THE PREFERRED EMBODIMENTS

In brief, the preparation of the novel polymeric derivatives of this invention involves: (1) the condensation polymerization of alpha-hydroxypropionic acid (hereinafter referred to as a-HPA) with at least one beta-hydroxyalkanoic acid (hereinafter referred to as the BHA); the latter beta-hydroxyalkanoic acids being selected from the group consisting of beta-hydroxypropionic acid (hereinafter referred to as b-HPA) and beta-hydroxybutyric acid (hereinafter referred to as HBA); and, (2) the acrylation of the resulting condensation polymers with any of a wide variety of carboxylic acids, acid chlorides and acid anhydrides thereby yielding compounds which will, for the sake of brevity, hereinafter be referred to as "ester acids." The latter ester acids may, thereafter, be converted into their corresponding alkali metal, alkaline-earth metal and ammonium salts.

The polymerization procedure is typically conducted in an inert atmosphere, such as under nitrogen gas, at temperatures ranging from about 80 to 200° C. Mole ratios of BHA: a-HPA, which range from about 1:4 to 4:1 may be utilized therein. The length of the reaction is dependent on the reaction temperature, the mole ratio of the reactants and the extent of polymerization that is desired. In order to obtain polymers of specified molecular weight, the progress of the polymerization reaction is monitored by periodically removing samples from the reaction mix and determining the free acidity, in terms of the average neutralization equivalent, of the reaction product. Since the neutralization equivalent is indicative of the average molecular weight of the polymer, the desired product may be obtained by terminating the polymerization reaction upon reaching a specified neutralization equivalent. For purposes of this invention, polymers exhibiting average neutralization equivalents of from about 155 to 475 will ordinarily be prepared and thereafter subjected to the necessary acrylation reaction. The latter polymers are additionally characterized by their solubility in alcohols, ketones, aromatic hydrocarbons, chlorinated hydrocarbons and ether solvents.

It is, thus, to be observed that the "polymers" referred to in this disclosure may comprise: (1) condensation copolymers of HBA with a-HPA; (2) condensation copolymers of b-HPA with a-HPA; and, (3) condensation terpolymers of HBA, b-HPA and a-HPA. Also to be included within the scope of the term "polymer" are mixtures of monomers and dimers of the specified monomeric components such as will be produced when $n$, in the above described formula, has a value of less than one.

The acyl derivatives of the above described BHA-a-HPA polymers may be prepared by reacting equimolar portions of the polymer and the selected acrylating agent at a temperature of from about 60 to 200° C. An inert gas is bubbled through the reaction mixture in order to expel the hydrogen chloride which is generated when an acid chloride is utilized as the acrylating agent. In the latter instance, the reaction is terminated when the evolution of hydrogen chloride has ceased. The resulting molten reaction product is then cooled and powdered. By means of this procedure, yields in excess of about 94% of the theoretical are generally obtained. The resulting ester acids are usually soluble in alcohols, ketones, aromatic hydrocarbons, chlorinated hydrocarbons and ethers.

Among the applicable acrylating agents which may be utilized in the novel process of this invention are included: saturated and unsaturated aliphatic carboxylic acids containing from 4 to 22 carbon atoms such, for example, as butyric, caproic, lauric, myristic, palmitic, stearic, oleic and behenic acids; aromatic carboxylic acids such as benzoic acid, naphthalene monocarboxylic acid, and toluic acid; cycloaliphatic carboxylic acids such as cyclohexane monocarboxylic acid, and abietic acid; and ar-aliphatic carboxylic acids such as phenyl stearic acid, and phenyl acetic acid; as well as the acid chlorides and acid anhydrides thereof. It should be noted that the preferred acrylating agents, for the purposes of this invention, are the acid chlorides of the above identified acids. Specific examples of such acid chlorides include: butyryl chloride, caproyl chloride, lauroyl chloride, palmitoyl chloride, stearyl chloride, behenyl chloride and benzoyl chloride. It should be further noted that the corresponding acid anhydrides are particularly useful in the preparation of short chain acyl derivatives.

The corresponding salts of the ester acids of the BHA-a-HPA polymers may then be prepared, if desired, by reacting the resulting ester acids with a reagent selected from the group consisting of alkali metal salts such as bicarbonates and carbonates, alkali metal hydroxides, alkali metal oxides, salts of alkaline-earth metals, oxides of alkaline-earth metals, ammonium salts and quaternary ammonium hydroxides. The reaction procedure will ordinarily involve dissolving the ester acid in an alcohol, such as ethanol, and adding thereto an aqueous solution of the selected metal salt. The reaction proceeds for a period of about 30 to 60 minutes at a temperature of from about 5 to 40° C. The neutralized solution is then crystallized and a fine, white crystalline product is obtained after filtering, washing and drying, under vacuum, at a temperature of from about 25 to 50° C. for a period of about 24 to 48 hours. The alkaline-earth salts of the novel derivatives of this invention may be prepared by an alternate procedure whereby the ester acid is agitated in the presence of an alkaline-earth oxide, which is dissolved in a 95% alcohol solution, for a period of 24 to 48 hours and then filtered and dried in order to obtain the resulting white precipitate.

Still another method for the preparation of these ester salts is the fusion technique which comprises a procedure of great commercial interest. This fusion technique involves the slow addition of the selected metal salt, which should be in finely powdered form, to the ester acid and thereupon reacting the mixture at a temperature of from about 100 to 200° C. for a period of about 1 to 2 hours. The reaction is conducted under a stream of inert gas which serves to drive off the water which is produced during the salt formation. The resulting viscous product is then poured onto a hard surface, whereupon it is scraped and powdered.

With respect to proportions, when the metal salt has a univalent cation, e.g. $Na^+$, $K^+$ or $NH_4^+$, it is necessary to use essentially equimolar concentrations of the salt and the ester acid. However, when the metal salt has a divalent cation e.g. $Ca^{++}$, $Ba^{++}$ or $Mg^{++}$, it is necessary to use a concentration of about 0.5 mole of the salt per mole of ester acid.

An additional method which may be utilized to prepare the novel products of this invention has been found to be particularly suitable for the synthesis of long chain acyl derivatives. Furthermore, it provides a one step procedure for preparing the corresponding ester salts of the acyl derivatives of this invention. Thus, in this procedure, the BHA-a-HPA polymer is reacted with at least one carboxylic acid selected from the group listed hereinabove, at temperatures of from about 100 to 250° C. for a period of from about 1 to 4 hours. If it is desired to prepare an ester salt by means of this procedure, it is merely necessary to add the specific metal salt to the initial reaction mix. The procedure is typically conducted in an atmosphere of a non-oxidizing gas, such as nitrogen, in order to prevent oxidation and subsequent discoloration of the product as well as to expel the water that is a by-product of the esterification reaction and the subsequent salt formation.

Still another one step procedure which may be used to prepare the acyl derivatives of this invention as well as their corresponding ester salts involves reacting, in an inert atmosphere and at temperatures of from about 100 to 250° C. for a period of about 1 to 7 hours, a mixture of the desired monomeric components and a long chain carboxylic acid. A metal salt may also be included in the initial reaction mixture if it is desired to prepare an ester salt end-product. It is to be noted that this procedure also eliminates the need for a separate initial polymerization reaction between the BHA with the a-HPA.

As previously noted, the novel derivatives of this invention are to be primarily used as food additives and shortening aids which assist shortenings, e.g. buttter, lard and other fats which are added to a raw dough mix which ordinarily always contains flour, water and a selected shortening prior to the baking thereof, thereby leading to the preparation of improved baked goods. The means to be employed in carrying out the latter end use for our derivatives are, of course, readily apparent to those skilled in the cooking, baking and/or food technology arts.

For example, the basic means of preparing various types of baked goods wherein the novel additives of this invention may be incorporated are well known to those skilled in the art. Thus, bread may be prepared in either a batch or continuous process, by the combination of basic ingredients such as flour, yeast, water and salt, in a "sponge and dough" procedure. Other ingredients such, for example, as sugar, milk and shortening may be included for the preparation of commercial breads, while eggs and other leavening agents are added in the preparation of cakes. It should be noted that any suitable recipes for baked goods may be utilized in the novel process of this invention and that it is the intention of this invention to cover the preparation of a wide range of improved baked goods, e.g. breads, cakes, rolls, buns, etc.

In practising the novel process of this invention, it is necessary that the ester acids and ester salts utilizable therein be incorporated in the raw dough mix being utilized, prior to the baking of the latter. The additives should be present in the latter raw dough mixes in concentrations of from about 0.1 to 1.5% as based on the weight of flour in the raw dough mix. Thus, the ester acids and the water soluble ester salts may be dissolved in a portion of the total water content which may be at a temperature of from about 25 to 80° C.; the resulting hot, aqueous solution then being dispersed in the flour or, the insoluble ester salts can be dissolved in the liquefied fat constituent of the formulation and thereby incorporated in the dough. Both methods of addition are acceptable since neither has any adverse effect on the properties of the resulting baked goods. In any event, it is essential that there should be a complete and uniform dispersal of the additive and any methods capable of providing such intimate dispersion without deleteriously affecting the resultant product are acceptable for use in this process.

The inclusion of the ester acids and ester salts by means of the novel process of this invention, provides the resulting baked goods with many desirable qualities. Thus, the shelf-life of the baked goods is greatly extended in that firming and staling tendencies are retarded. Light, fluffy products with increased volume are obtained. Furthermore, the baked goods are provided with a fine texture, thus insuring the elimination of a coarse, stringy grain. The natural color of the baked goods is also reinforced. Thus, for example, white bread exhibits a truer, whiter color. In addition, the baked goods prepared by the process of this invention display both a pleasant flavor and aroma.

Moreover, the derivatives of the present invention are useful in the preparation of other starch-containing food products. Thus, if used to treat starch-containing food products just prior to their being cooked, our novel additives have been found to impart improved properties to the quality and texture of such products as instant potatoes, macaroni and spaghetti products, hot breakfast food cereals, starch-based pie fillings and dessert puddings, dehydrated creamed soups, and various rice products. In each case the starch-containing food product is improved as to both its quality and texture as a result of the ability of our novel additives to reduce the inherent stickiness and pastiness of such products.

The following examples will more fully illustrate the embodiment of this invention. In these examples, all parts given are by weight unless otherwise noted.

Example I

This example illustrates the preparation of one of the HBA-a-HPA condensation copolymers typical of the products of this invention.

A mixture of 156 parts of an 85%, by weight, aqueous solution of HBA and 135 parts of an 85%, by weight, aqueous solution of a-HPA was evaporated, under reduced pressure, until all traces of water were removed. The resulting mix, which contained a 1:1 molar ratio of HBA: a-HPA, was then charged into a reaction vessel fitted with a nitrogen inlet and a distillation apparatus. While a steady stream of nitrogen gas was passed through the system, the temperature was raised to 175–180° C. whereupon the condensation polymerization reaction was allowed to proceed. Small samples of the product were removed periodically and titrated against standard sodium methoxide solution in order to determine the neutralization equivalent of the product and to thereby follow the progress of the polymerization reaction. After a period of 90 minutes had elapsed, the neutralization equivalent was found to be at the desired value of 177 and the system was cooled in order to terminate the polymerization reaction. The resulting copolymer, which had been prepared in a 92% yield, was in the form of a colorless, viscous liquid.

Example II

This example illustrates the preparation of a typical acyl derivative of this invention utilizing as the intermediate therefor, the HBA-a-HPA condensation copolymer whose preparation was described in Example I, hereinabove.

Thus, 35.4 parts of the copolymer and 55.0 parts of palmitoyl chloride were charged into a reaction vessel fitted with a nitrogen inlet, a condenser and means for mechanical agitation. The reaction was allowed to proceed at a temperature of 50° C. for a period of 60 minutes, while a moderate stream of nitrogen gas was maintained in the system in order to expel the hydrogen chloride that was produced as a result of the reaction. The temperature of the reaction was then increased to 120° C. and the reaction was allowed to continue at that temperature for an additional hour. The resulting molten product was then cooled.

The efficiency of the reaction was indicated by the yield, which was 96% of theory, as well as by the resulting pure, white palmitic acid ester which had a melting point of 33–35° C. and a neutralization equivalent of 398.

Example III

This example illustrates the preparation of a typical ester salt of the polymers of this invention utilizing, as the intermediate therefor, the ester acid whose preparation was described in Example II, hereinabove.

A reaction vessel equipped with a nitrogen inlet, a distillation apparatus and means for mechanical agitation was charged with 15.0 parts of the palmitic acid ester prepared in Example II and 3.17 parts of sodium bicarbonate. The reaction was conducted, under a slow stream of nitrogen gas, at a temperature of 140° C. for a period of 90 minutes. The resulting sodium salt was in the form of a white solid which had a melting point of 51–53° C.

The latter preparative procedure was then repeated, under identical conditions, with the exception that 3.80 parts of potassium bicarbonate and 1.06 parts of calcium oxide were each, in turn, substituted for the sodium bicarbonate. The resulting potassium salt had a melting point of 50–52° C. while the calcium salt had a melting point of 66–67° C.

Example IV

This example illustrates the preparation of a typical ammonium ester salt of the polymers of this invention.

A reaction vessel equipped with a condenser, a dropping funnel and means for mechanical agitation was charged with 15 parts of the palmitic acid ester whose preparation was described in Example II, hereinabove, and 250 parts of methanol. Upon completely dissolving the ester acid, 1.32 parts of ammonium hydroxide were slowly added to the solution. After agitating the reaction mixture for a period of about 60 minutes, the white ammonium salt came out of solution.

Example V

This example illustrates the preparation of additional HBA-a-HPA condensation copolymers by means of the process of this invention.

The general procedure set forth in Example I, hereinabove, was utilized in order to prepare the various copolymers described in the following table. The reaction conditions as well as the concentrations of the monomers were varied in order to prepare copolymers of different molecular weight.

| Copolymer No. | 1 | 2 | 3 | 4 | 5 | 6 | 7 |
|---|---|---|---|---|---|---|---|
| HBA, parts | 20.8 | 26.5 | 58.8 | 20.8 | 41.6 | 62.4 | 83.2 |
| a-HPA, parts | 18.0 | 23.0 | 50.8 | 72.0 | 54.0 | 36.0 | 18.0 |
| Mole ratio of HBA:a-HPA | 1:1 | 1:1 | 1:1 | 1:4 | 2:3 | 3:2 | 4:1 |
| Reaction temperature, °C | 175–180 | 120–125 | 175–180 | 175–180 | 175–180 | 175–180 | 175–180 |
| Total reaction time, (min.) | 180 | 420 | 390 | 75 | 60 | 75 | 90 |
| Neutralization equivalent | 245 | 155 | 475 | 175 | 171 | 173 | 166 |

Example VI

This example illustrates the preparation of additional ester acid derivatives of the polymers of this invention.

The general procedure set forth in Example II, hereinabove, was utilized in order to prepare the ester acids described in the following table:

| Derivative No. | 1 | 2 | 3 | 4 | 5 | 6 |
|---|---|---|---|---|---|---|
| HBA-a-HPA copolymer (as prepared in Ex. I), parts | 17.7 | 17.7 | 11.7 | | | 35.4 |
| Copolymer No. 1 of Example V, parts | | | | 10.0 | | |
| Copolymer No. 3 of Example V, parts | | | | | 20.0 | |
| Lauroyl chloride, parts | 21.8 | | | | | |
| Myristoyl chloride, parts | | 24.7 | | | | |
| Stearyl chloride, parts | | | 20.0 | | | |
| Palmitoyl chloride, parts | | | | 11.3 | 11.6 | |
| Butyryl chloride, parts | | | | | | 21.3 |
| Time of initial reaction at 80° C., hours | 1 | 1 | 1 | 1 | 1 | 21 |
| Time of reaction at 125° C., hours | 1 | 1 | 1 | 2½ | | |
| Neutralization equivalent of ester acid | 325 | 371 | 409 | 458 | 673 | 245 |
| Melting point, °C | (1) | (1) | 30–31 | 46–47 | 50–52 | (1) |
| Yield (percent of theory) | 94 | 95 | 96 | 96 | 96 | 83 |

1 Liquid.

The results summarized above clearly indicate a high degree of reaction efficiency as evidenced by the high yields and the excellent physical properties of the products thus recovered.

Example VII

This example illustrates the preparation of several additional sodium ester salts of the polymers of this invention using, as the base materials, each of the respective ester acids prepared in Example VI, hereinabove.

The procedure used to prepare the ester salts of this example, as described in the following table, was identical to the procedure set forth in Example III.

| Ester salt No. | 1 | 2 | 3 | 4 | 5 | 6 |
|---|---|---|---|---|---|---|
| Derivative No. 1 of Example VI, parts | 15.0 | | | | | |
| Derivative No. 2 of Example VI, parts | | 15.0 | | | | |
| Derivative No. 3 of Example VI, parts | | | 15.0 | | | |
| Derivative No. 4 of Example VI, parts | | | | 15.0 | | |
| Derivative No. 5 of Example VI, parts | | | | | 15.0 | |
| Derivative No. 6 of Example VI, parts | | | | | | 15.0 |
| Sodium bicarbonate, parts | 3.84 | 3.41 | 3.04 | 2.75 | 1.87 | 5.06 |
| Reaction temperature, °C | 140 | 140 | 140 | 140 | 140 | 140 |
| Total reaction time, hours | 1½ | 1½ | 1½ | 1½ | 1½ | 1½ |
| Melting point, °C | | | 67–68 | 61–63 | 51–53 | |

Example VIII

This example illustrates an additional method for preparing the novel ester salts of the polymers of this invention; the latter method combining the esterification and salt formation reactions.

In this procedure, the HBA-a-HPA copolymer, the carboxylic acid, and the metal salt were charged into a reaction vessel equipped with a nitrogen inlet, a distillation apparatus and means for mechanical agitation. The reaction was conducted at a temperature of 220–225° C. for a period from 1 to 2 hours, while under a moderate stream of nitrogen gas. The resulting molten product was then cooled and powdered.

The following table sets forth the ingredients and reaction conditions utilized in preparing various ester salts by means of the above described procedure.

| Ester salt No | 7 | 8 | 9 | 10 | 11 | 12 | 13 | 14 | 15 | 16 |
|---|---|---|---|---|---|---|---|---|---|---|
| HBA-a-HPA copolymer (as prepared in Example I), parts | 8.8 | 8.8 | 8.8 | | 8.8 | 35.2 | | | | |
| Copolymer No. 4 of Example V, parts | | | | 17.6 | | | 35.0 | | | |
| Copolymer No. 5 of Example V, parts | | | | | | | | 34.2 | | |
| Copolymer No. 6 of Example V, parts | | | | | | | | | 34.6 | |
| Copolymer No. 7 of Example V, parts | | | | | | | | | | 33.2 |
| Palmitic acid, parts | 12.8 | | | | | | | | | |
| Lauric acid, parts | | 10.0 | | | | | | | | |
| Myristic acid, parts | | | 11.4 | | | | | | | |
| Stearic acid, parts | | | | 28.4 | | | | | | |
| 1:1 mixture of palmitic and stearic acids, parts | | | | | | | 53.4 | 53.4 | 53.4 | 53.4 |
| Behenic acid, parts | | | | | 17.0 | | | | | |
| Sodium bicarbonate, parts | | | | | | 16.8 | | | | |
| Calcium oxide, parts | 1.4 | 1.4 | 1.4 | 2.8 | 1.4 | | 5.6 | 5.6 | 5.6 | 5.6 |
| Total reaction time, hours | 1 | 1 | 1 | 2 | 2 | 2 | 1½ | 1½ | 4¾ | 4¾ |
| Melting point, °C | 81–83 | 87–89 | 87–89 | 56 | 83–84 | 65–67 | 42–44 | 48–50 | 58–60 | 86–87 |

Example IX

This example illustrates an additional method for preparing the novel ester salts of the polymers of this invention; the latter method eliminating the need for individual polymerization, esterification and salt formation reactions.

A reaction vessel equipped with a nitrogen inlet, a distillation apparatus and means for mechanical agitation was charged with 20.8 parts of HBA, 18 parts of a-HPA, 56.8 parts of stearic acid, and 5.6 parts of calcium oxide. The temperature of the system was raised to 210–215° C. and the reaction allowed to proceed at that temperature for a period of 3½ hours. The resulting molten calcium salt was cooled and pulverized. It was in the form of a white powder having a melting point of 47–48° C.

Example X

This example illustrates the preparation of typical calcium ester salts of several of the condensation polymers of this invention.

The general procedure set forth in Example IX, hereinabove, was utilized in order to prepare the calcium ester salts described in the following table:

| Ester salt No | 17 | 18 | 19 | 20 | 21 |
|---|---|---|---|---|---|
| HBA | | | | 10.4 | 10.4 |
| b-HPA | 18.0 | 18.0 | 18.0 | | |
| a-HPA | 18.0 | 18.0 | 18.0 | 9.0 | 9.0 |
| Palmitic acid | 51.2 | | | | |
| Stearic acid | | 56.8 | | | |
| Behenic acid | | | 68.0 | | |
| Phenyl stearic acid | | | | 37.8 | |
| Abietic acid | | | | | 34.4 |
| Calcium oxide | 5.6 | 5.6 | 5.6 | 2.8 | 2.8 |
| Total reaction time (hours) | 2 | 1½ | 2 | 7 | 4 |
| Melting point, °C | 44–45 | 52–53 | 63–64 | (¹) | 130–133 |

¹ Viscous liquid.

EXAMPLE XI

This example illustrates the preparation of a calcium ester salt of an HBA, b-HPA, a-HPA terpolymer of this invention.

The general procedure set forth in Example IX, hereinabove, was utilized in order to prepare the following calcium ester salt.

| | Parts |
|---|---|
| HBA | 10.4 |
| b-HPA | 9.0 |
| a-HPA | 18.0 |
| Stearic acid | 56.8 |
| Calcium oxide | 5.6 |
| Total reaction time (hours) | 2 |
| Melting point (° C.) | 51–52 |

EXAMPLE XII

This example illustrates the preparation of white bread by means of the novel process of this invention, whereby unique polymeric additives are included in the dough mix. It further illustrates the improved properties of the resulting white bread.

The white bread was prepared using the "sponge-dough" procedure. In preparing the sponge, the following ingredients were utilized; their concentrations, on a percentage basis, being calculated upon the total weight of flour which was utilized.

| | Percent |
|---|---|
| Flour | 70.0 |
| Lard | 2.0 |
| Yeast | 2.5 |
| Yeast food | 0.75 |
| Water | 37.5 |

The sponge resulting from the admixture of the above ingredients was mixed for three minutes at a slow speed, i.e. 40 r.p.m., while its temperature was maintained at 80° F. Thereafter, the sponge was fermented for a period of 4¾ hours in a fermentation cabinet which was maintained at a constant temperature of 80° F. and a relative humidity of 91%.

After the sponge fermentation period, the following ingredients, in concentrations calculated upon the total weight of flour utilized, were added and the complete mix was blended for two minutes at the above noted slow speed and for four minutes at a higher speed, i.e. 90 r.p.m.

| | Percent |
|---|---|
| Flour | 30.0 |
| Corn sugar | 8.0 |
| Non-fat milk solids | 3.0 |
| Salt | 2.0 |
| Water | 24.5 |
| Ester acid or ester salt of a BHA-a-HPA polymer (the specific additive utilized in each case is listed in the table hereinbelow) | 0.5 |

It should be noted that the alkali metal and ammonium salts of our polymers were generally incorporated into the dough mix by being dissolved in part of the total water content which was at a temperature of 25° C. On the other hand, the alkaline-earth metal salts as well as the ester acids were uniformly dispersed through the dough by being dissolved in liquified lard, the resulting solution thereupon being blended with the flour.

During the mixing procedure, the temperature of the dough was maintained at 80° F. After mixing, the dough was kept in the fermentation cabinet, under the above stated atmospheric conditions, for a total of 45 minutes floor time. At this point, three pieces, each weighing 325 grams, were removed from the dough, rounded and rested for 10 minutes before molding. The dough pieces were thereupon molded and panned in 2¼ inch deep baking pans whose top and bottom dimensions were, respectively, 7½" x 3½" and 6¾" x 3".

The panned dough pieces were then proofed, i.e. raised, to the desired volume in a proofing cabinet maintained at a temperature of 104° F. and a relative humidity of 80%. The panned dough was then baked for 21 minutes at a temperature of 431° F. The bread was taken from the oven, depanned and allowed to cool to room temperature over a period of 18 hours.

Once cooled, each loaf was weighed and its volume determined by measuring the volume of poppy seed displaced when the loaf of bread was placed into a known volume of poppy seed. The loaves were then sliced into one centimeter thick sections. These sections were packaged in polyethylene bags which were then closed so as to form an air-tight seal and stored at a constant temperature of 73° F. and a relative humidity of 50% to await further testing procedures.

Compressibility tests, i.e. determination of the measure of softness, were conducted on the center cuts of the above prepared, one centimeter thick bread slices. After conditioning the slices for periods of 24 and 48 hours at room temperature, compressibility was measured using a penetrometer having a plunger 1 cm. in diameter and weighing 47.53 grams. The plunger was allowed to penetrate into different points of the slice for a period of 15 seconds at each point of penetration, at which time its movement was arrested and the depth of penetration measured with a dial micrometer calibrated in tenths of a millimeter. An average of twelve such readings were taken on slices which had been removed from three different loaves.

Subjective tests were also conducted on slices which had been stored at room temperature for periods of 24 and 48 hours. Thus, softness and grain appearance were respectively evaluated on a scale wherein a high score of 10 was assigned to the samples having the highest ratings in each of the latter properties.

The results of these tests, as summarized in the following table, clearly indicate the improved qualities of bread prepared by means of the novel process of this invention. Data obtained from tests performed on samples of white bread which did not contain any additives were also included in the table in order to present a direct comparison and to indicate the superior results obtained when the novel derivatives of this invention are utilized as baked goods additives in the process of this invention. These latter breads were prepared in a manner identical to the procedure described hereinabove.

Summarizing, it is thus seen that this invention provides for the preparation of a novel class of acyl polymeric derivatives as well as for the preparation of food products, notably baked goods, that exhibit improved appearance and taste characteristics.

As previously noted, the novel derivatives of this invention are primarily useful as food additives and shortening aids. Shortenings, have been characterized as "edible fats which are used to shorten or tenderize foods," and as products which ". . . tenderize foods, notably baked goods, by interposing films and/or clumps of fat throughout the food in such a manner that the protein and carbohydrate components do not cook to a hardened mass"; the latter descriptions appears in "The Encyclopedia of Chemical Technology," volume 12, page 260, 1954, Interscience, New York, N.Y. A shortening aid, such as our novel derivatives, improves the efficiency of the shortening when used in small amounts, either replacing some shortening or being used in addition thereto. Thus, our novel derivatives assist the shortening component, which is usually added to a raw dough mix which ordinarily always contains at least flour, water and the selected shortening prior to the baking thereof, thereby leading to the preparation of further improved baked goods. The means to be employed in carrying out the latter end use for our derivatives are, of course, readily apparent to those skilled in the cooking, baking and/or food technology arts.

Variations may be made in proportions, procedures and materials without departing from the scope of this invention which is defined by the following claims.

We claim:
1. The acyl derivatives of the condensation polymers of the monomers (1) alpha-hydroxypropionic acid; and, (2) at least one beta-hydroxyalkanoic acid selected from the group consisting of beta-hydroxypropionic acid and beta-

| Additive | Compressibility | | Average weight, grams | Average volume, ml. | Subjective test | | | |
|---|---|---|---|---|---|---|---|---|
| | | | | | 24 hours | | 48 hours | |
| | 24 hours | 48 hours | | | Softness | Grain | Softness | Grain |
| Palmitic acid ester (Ex. II) | 39 | 31 | 283 | 1,107 | 9 | 9 | 9 | 9 |
| Sodium salt of palmitic acid ester (Ex. III) | 37 | 24 | 283 | 1,123 | 8 | 8 | 6 | 8 |
| Control [1] | 31 | 22 | 285 | 1,087 | 5 | 5 | 4 | 5 |
| Calcium salt of palmitic acid ester (Ex. III) | 42 | 35 | 286 | 1,073 | 8 | 8 | 8 | 8 |
| Ammonium salt of palmitic acid ester (Ex. IV) | 40 | 30 | 284 | 1,080 | 7 | 7 | 6 | 8 |
| Sodium salt of stearic acid ester (Ex. VII-3) | 44 | 42 | 285 | 1,100 | 9 | 9 | 9 | 9 |
| Control [1] | 32 | 25 | 283 | 1,030 | 5 | 6 | 4 | 6 |
| Calcium salt of palmitic acid ester (Ex. VIII-7) | 39 | 33 | 284 | 1,087 | 8 | 8 | 9 | 8 |
| Calcium salt of myristic acid ester (Ex. VIII-9) | 32 | 24 | 282 | 1,047 | 6 | 6 | 4 | 6 |
| Calcium salt of stearic acid ester (Ex. VIII-10) | 41 | 31 | 283 | 1,107 | 9 | 9 | 8 | 9 |
| Calcium salt of behenic acid ester (Ex. VIII-11) | 34 | 26 | 284 | 1,053 | 7 | 7 | 6 | 7 |
| Control [1] | 28 | 23 | 286 | 1,033 | 5 | 4 | 4 | 4 |
| Calcium salt of mixed palmitic-stearic acid ester (Ex. VIII-16) [2] | 52 | 43 | 281 | 1,060 | 9 | 9 | 9 | 9 |
| Do | 46 | 33 | 284 | 1,020 | 8 | 9 | 7 | 9 |
| Sodium salt of mixed palmitic-stearic acid ester (Ex. VIII-12) | 49 | 36 | 281 | 1,003 | 8 | 7 | 8 | 7 |
| Control [1] | 36 | 26 | 288 | 960 | 4 | 3 | 3 | 6 |
| Sodium salt of palmitic acid ester (Ex. VII-4) | 42 | 33 | 279 | 1,100 | 9 | 9 | 7 | 9 |
| Sodium salt of palmitic acid ester (Ex. VII-5) | 31 | 25 | 281 | 1,071 | 5 | 5 | 4 | 5 |
| Potassium salt of palmitic acid ester (Ex. III) | 41 | 39 | 280 | 1,103 | 8 | 8 | 9 | 8 |
| Control [1] | 30 | 23 | 281 | 1,016 | 4 | 5 | 3 | 5 |
| Calcium salt of mixed palmitic-stearic acid ester (Ex. VIII-16) [3] | 41 | 33 | 283 | 1,083 | 7 | 8 | 8 | 8 |
| Do | 48 | 41 | 279 | 1,140 | 9 | 9 | 9 | 9 |
| Do [4] | 44 | 32 | 280 | 1,100 | 8 | 8 | 7 | 8 |
| Control [1] | 31 | 21 | 286 | 1,000 | 4 | 6 | 3 | 6 |
| Calcium salt of palmitic acid ester (Ex. X-17) | 39 | | 285 | 976 | 9 | 7 | | |
| Calcium salt of stearic acid ester (Ex. X-18) | 35 | | 290 | 978 | 8 | 8 | | |
| Calcium salt of behenic acid ester (Ex. X-19) | 34 | | 290 | 943 | 7 | 7 | | |
| Control [1] | 28 | | 292 | 808 | 3 | 4 | | |
| Calcium salt of phenyl stearic acid ester (Ex. X-20) | 31 | | 283 | 878 | 6 | 7 | | |
| Control [1] | 27 | | 284 | 860 | 3 | 4 | | |
| Calcium salt of stearic acid ester (Ex. XI) | 41 | | 283 | 1,010 | 9 | 9 | | |
| Control [1] | 30 | | 285 | 850 | 5 | 4 | | |

[1] Since a comparative test for baked goods is only valid where the baked good samples are prepared simultaneously, a control was therefore included with each test series.
[2] The calcium salt was incorporated into the dough mix by being dispersed in part of the total water content as opposed to being incorporated in the typical lard addition procedure.
[3] This additive was present in the raw dough mix in a concentration of 0.4%, based on the weight of flour in the raw dough mix.
[4] This additive was present in the raw dough mix in a concentration of 0.6%, based on the weight of flour in the raw dough mix.

hydroxbutyric acid, said acyl derivatives corresponding to the formula $$R-\overset{O}{\underset{\|}{C}}-\left(Z\right)_n-O-X$$

wherein

Z represents the mer. corresponding to the formula $$\left[\left(-O-\underset{R'}{\underset{|}{C}H}-CH_2-\overset{O}{\underset{\|}{C}}-\right)_a \left(-O-\underset{CH_3}{\underset{|}{C}H}-\overset{O}{\underset{\|}{C}}-\right)_b\right]$$

wherein the moieties derived from the respective monomers (1) and (2) are deployed in said mer. in a purely random spatial arrangement; wherein R' is selected from the group consisting of a hydrogen atom and a methyl radical; and wherein the ratio a:b represents the mole ratio within the mer. of the moieties derived from the respective monomers (1) and (2) and ranges from about 1:4 to 4:1;

n ranges from 0.1 to 12 inclusive;

R is a radical selected from the group consisting of aliphatic radicals containing from 3 to 21 carbon atoms, cycloaliphatic, aromatic, ar-aliphatic radicals; and, X is selected from the group consisting of hydrogen atoms, alkali metal cations, alkaline-earth metal cations and ammonium radicals.

2. The acyl derivatives of claim 1, wherein the condensation polymers utilized in the preparation thereof have an average neutralization equivalent of from about 155 to 475 inclusive.

3. A process for the preparation of acyl derivatives corresponding to the formula $$R-\overset{O}{\underset{\|}{C}}-\left(Z\right)_n-OH$$

wherein

Z represents the mer. corresponding to the formula $$\left[\left(-O-\underset{R'}{\underset{|}{C}H}-CH_2-\right)_a \left(-O-\underset{CH_3}{\underset{|}{C}H}-\overset{O}{\underset{\|}{C}}-\right)_b\right]$$
(1)       (2)

wherein the moieties derived from the respective monomers (1) and (2) are deployed in said mer. in a purely random spatial arrangement; wherein R' is selected from the group consisting of a hydrogen atom and a methyl radical; and wherein the ratio a:b represents the mole ratio within the mer. of the moieties derived from the respective monomers (1) and (2) and ranges from about 1:4 to 4:1;

n ranges from 0.1 to 12 inclusive; and,

R is a radical selected from the group consisting of aliphatic radicals containing from 3 to 21 carbon atoms, cycloaliphatic, aromatic, ar-aliphatic radicals;

said process comprising the steps of: (1) condensing monomeric alpha-hydroxypropionic acid, at elevated temperatures in the range 80° C. to 200° C., with at least one monomeric beta-hydroxyalkanoic acid selected from the group consisting of beta-hydroxypropionic acid and beta-hydroxybutyric acid so as to form a condensation polymer containing moieties derived from each of the respective monomeric acids present in the system; (2) reacting, at elevated temperatures in the range 60° C. to 200° C., the condensation polymer resulting from step (1) with an acylating agent; and, (3) recovering the resulting acyl derivative.

4. The process of claim 3, wherein the molar ratio of the moieties derived from monomeric alpha-hydroxypropionic acid and the monomeric beta-hydroxyalkanoic acid(s) in said condensation polymer ranges from about 1:4 to 4:1.

5. The process of claim 3, wherein said condensation polymer has an average neutralization equivalent of from about 155 to 475 inclusive.

6. The process of claim 3, wherein said condensation polymer and said acylating agent are present in equimolar concentrations.

7. The process of claim 3, wherein said acylating agent is selected from the group consisting of saturated and unsaturated aliphatic carboxylic acids containing from 4 to 22 carbon atoms, aromatic carboxylic acids, cycloaliphatic carboxylic acids, ar-aliphatic carboxylic acids, acid chlorides of the latter acids, and acid anhydrides of the latter acids.

8. The process of claim 3, wherein steps (1) and (2) are conducted simultaneously.

9. A process for the preparation of ester salts of acyl derivatives corresponding to the formula $$R-\overset{O}{\underset{\|}{C}}-\left(Z\right)_n-O-X$$

wherein

Z represents the mer. corresponding to the formula $$\left[\left(-\underset{R'}{\underset{|}{C}H}-CH_2-\overset{O}{\underset{\|}{C}}-\right)_a \left(-O-\underset{CH_3}{\underset{|}{C}H}-\overset{O}{\underset{\|}{C}}-\right)_b\right]$$
(1)       (2)

wherein the moieties derived from the respective monomers (1) and (2) are deployed in said mer, in a purely random spatial arrangement; wherein R' is selected from the group consisting of a hydrogen atom and a methyl radical; and wherein the ratio a:b represents the mole ratio within the mer. of the moieties derived from the respective monomers (1) and (2) and ranges from about 1:4 to 4:1;

n ranges from 0.1 to 12 inclusive;

R is a radical selected from the group consisting of aliphatic radicals containing from 3 to 21 carbon atoms, cycloaliphatic, aromatic, ar-aliphatic radicals; and, X is selected from the group consisting of alkali metal cations, alkaline-earth metal cations and ammonium radicals;

said process comprising the steps of: (1) condensing monomeric alpha-hydroxypropionic acid, at elevated temperatures in the range 80° C. to 200° C., with at least one monomeric beta-hydroxyalkanoic acid selected from the group consisting of beta-hydroxypropionic acid and beta-hydroxybutyric acid so as to form a condensation polymer containing moieties derived from each of the respective monomeric acids present in the system; (2) reacting, at elevated temperatures in the range 60° C. to 200° C., the condensation polymer resulting from step (1) with an acylating agent; (3) reacting the acyl derivative resulting from step (2) with a stoichiometric amount of a reagent selected from the group consisting of alkali metal salts, alkali metal hydroxides, salts of alkaline-earth metals, oxides of alkaline-earth metals, ammonium salts and quaternary ammonium hydroxides; and, (4) recovering the resulting ester salt.

10. The process of claim 9, wherein the molar ratio of the moieties derived from monomeric alpha-hydroxypropionic acid and the monomeric beta-hydroxyalkanoic acid(s) in said condensation polymer ranges from about 1:4 to 4:1.

11. The process of claim 9, wherein said condensation polymer has an average neutralization equivalent of from about 155 to 475 inclusive.

12. The process of claim 9, wherein said condensation polymer and said acylating agent are present in equimolar concentrations.

13. The process of claim 9, wherein said acylating agent is selected from the group consisting of saturated and unsaturated aliphatic carboxylic acids containing from 4 to 22 carbon atoms, aromatic carboxylic acids, cycloaliphatic carboxylic acids, ar-aliphatic carboxylic acids, acid chlorides of the latter acids, and acid anhydrides of the latter acids.

14. The process of claim 9, wherein steps (1), (2) and (3) are conducted simultaneously.

References Cited
UNITED STATES PATENTS

| | | | |
|---|---|---|---|
| 2,789,992 | 4/1957 | Thompson et al. | 260—484 |
| 3,141,030 | 7/1964 | Buddemeyer et al. | 260—410.9 |

LEWIS GOTTS, Primary Examiner

R. S. WEISSBERG, Assistant Examiner

U.S. Cl. X.R.

99—91, 92; 260—468R, 469, 476R, 488R